US012354771B2

(12) United States Patent
Eshima et al.

(10) Patent No.: US 12,354,771 B2
(45) Date of Patent: Jul. 8, 2025

(54) COMPOSITE CABLE

(71) Applicant: Proterial, Ltd., Tokyo (JP)

(72) Inventors: Hirotaka Eshima, Tokyo (JP); Fumihito Oka, Tokyo (JP); Yoshikazu Hayakawa, Tokyo (JP); Tomoyuki Murayama, Tokyo (JP); Takahiro Futatsumori, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 17/952,716

(22) Filed: Sep. 26, 2022

(65) Prior Publication Data

US 2023/0095084 A1 Mar. 30, 2023

(30) Foreign Application Priority Data

Sep. 28, 2021 (JP) ................................ 2021-158246

(51) Int. Cl.

*H01B 7/04* (2006.01)
*H01B 7/18* (2006.01)
*H01B 7/295* (2006.01)
*H01B 9/00* (2006.01)
*H01B 9/02* (2006.01)
*H01B 11/04* (2006.01)
*H01B 3/30* (2006.01)

(52) U.S. Cl.

CPC ............... *H01B 9/006* (2013.01); *H01B 7/18* (2013.01); *H01B 7/295* (2013.01); *H01B 9/02* (2013.01); *H01B 3/30* (2013.01)

(58) Field of Classification Search

CPC .......... H01B 7/04; H01B 7/0045; H01B 7/17; H01B 9/003; H01B 11/04
See application file for complete search history.

(56) References Cited

U.S. PATENT DOCUMENTS

| | | | | |
|---|---|---|---|---|
| 9,214,260 | B2 * | 12/2015 | Ishikawa | H01B 11/1895 |
| 9,865,374 | B1 * | 1/2018 | Hayashishita | H01B 7/02 |
| 10,258,765 | B2 * | 4/2019 | Kashimura | H01B 3/441 |
| 2017/0229212 | A1 * | 8/2017 | Hayakawa | H01B 7/36 |
| 2019/0221914 | A1 * | 7/2019 | Kato | H01Q 1/2208 |
| 2020/0135363 | A1 * | 4/2020 | Esseghir | A01N 25/34 |
| 2020/0168364 | A1 * | 5/2020 | Huang | H01B 7/025 |

(Continued)

FOREIGN PATENT DOCUMENTS

| | | |
|---|---|---|
| JP | 2010129200 A | 6/2010 |
| JP | 2017131054 A | 7/2017 |

(Continued)

OTHER PUBLICATIONS

Japanese Notice of Reasons for Refusal dated May 7, 2025 for corresponding Japanese Application No. 2021158246, filed on Sep. 28, 2021.

*Primary Examiner* — Chau N Nguyen
(74) *Attorney, Agent, or Firm* — David D. Brush; Westman, Champlin & Koehler, P.A.

(57) ABSTRACT

A composite cable includes a plurality of internal cables and a covering member covering peripheries of the plurality of internal cables. At least one of the plurality of internal cables includes at least one electric wire having a conductor, a first sheath covering a periphery of the at least one electric wire, a shield covering a periphery of the first sheath, and a second sheath covering a periphery of the shield.

9 Claims, 1 Drawing Sheet

(56) References Cited

U.S. PATENT DOCUMENTS

| | | | | |
|---|---|---|---|---|
| 2020/0168367 | A1* | 5/2020 | Huang | H01B 11/04 |
| 2020/0185125 | A1* | 6/2020 | Huang | H01B 7/0009 |
| 2021/0233683 | A1* | 7/2021 | Grunwald | C08K 3/016 |

FOREIGN PATENT DOCUMENTS

| | | | |
|---|---|---|---|
| JP | 2018156807 | A | 10/2018 |
| JP | 2020024911 | A | 2/2020 |
| JP | 2020077632 | A | 5/2020 |

* cited by examiner

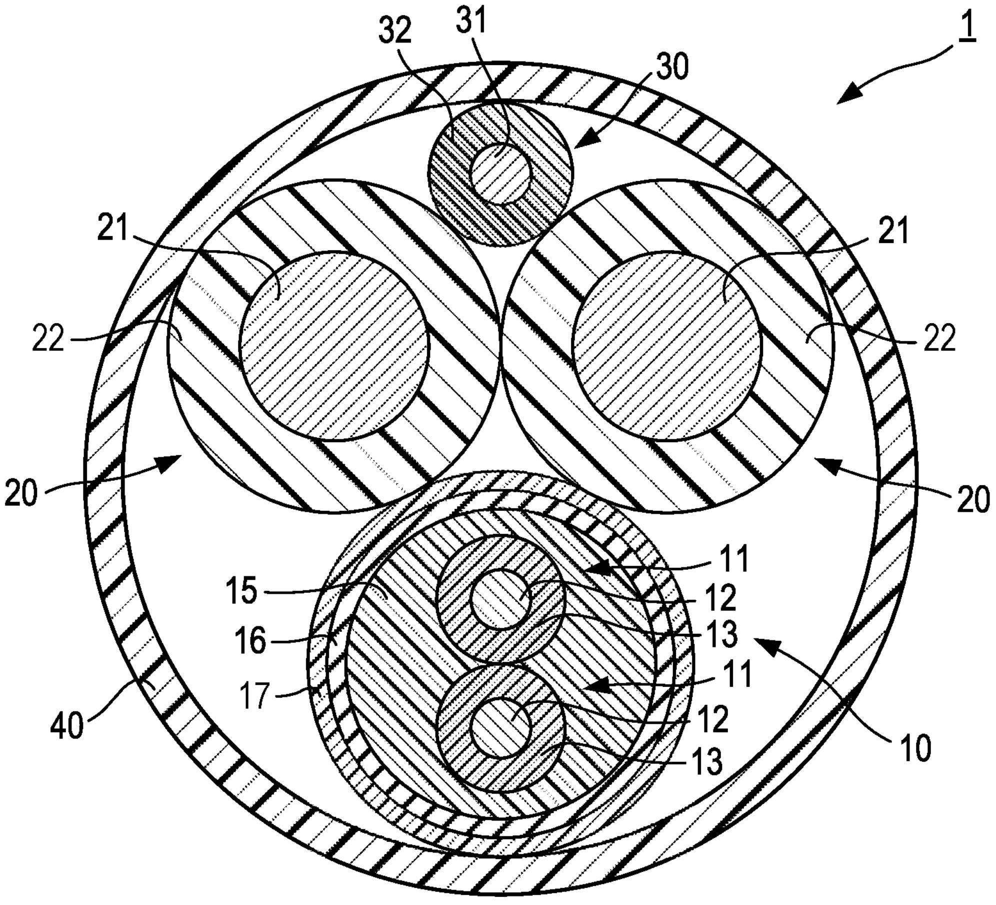
1
30
31
32
21
21
22
22
20
20
11
12
13
11
12
13
15
16
17
40
10

COMPOSITE CABLE

CROSS-REFERENCE TO RELATED APPLICATIONS

The present application claims priority based on Japanese Patent Application No. 2021-158246 filed to Japanese Patent Office on Sep. 28, 2021, and the content of Japanese Patent Application No. 2021-158246 is incorporated by reference in its entirety.

BACKGROUND

The present disclosure relates to a composite cable.

In recent years, an electro mechanical brake (hereinafter also referred to as "EMB") device using an electric motor or the like is beginning to be proposed in place of a brake device using hydraulic pressure. An electric parking brake device in which a parking brake is electrically operated is also known (see, for example, Japanese Unexamined Patent Application Publication No. 2020-077632).

SUMMARY

The EMB device or the like is connected with an electric wire (also referred to as "power wire") for supplying electric power to an electric motor, an electric wire (also referred to as "signal wire") for transmitting output of various sensors that measure parameters such as an angle, and the like. The plurality of electric wires may be covered with a common covering member to serve as a composite cable.

These electric wires are provided with a shield such as a braid that shields electromagnetic noise generated by the electric wires themselves or electromagnetic noise generated outside, and a sheath may be provided outside the shield. The outer sheath may apply a centripetal force to the shield to deform the shield.

When the composite cable is bent in a state where the shield is deformed, local stress concentration may occur in the shield, and the shield may be damaged. When the shield is damaged, there is a problem that the ability to shield electromagnetic noise is deteriorated.

The present disclosure has been made to solve the above problems, and an object is to provide a composite cable that easily suppresses occurrence of damage of a shield.

In order to achieve the above object, the present disclosure provides the following means.

A composite cable of one aspect of the present disclosure includes a plurality of internal cables and a covering member covering peripheries of the plurality of internal cables, and at least one of the plurality of internal cables includes at least one electric wire having a conductor, a first sheath covering a periphery of the at least one electric wire, a shield covering a periphery of the first sheath, and a second sheath covering a periphery of the shield.

In the composite cable of one aspect of the present disclosure, by arranging the electric wire, the first sheath, the shield, and the second sheath in this order from the inside to the outside, the shield is supported by the first sheath arranged on the electric wire side. Therefore, even when the shield receives a force directed from the second sheath toward the electric wire side, the cross-sectional shape of the shield is hardly deformed. Furthermore, even when the composite cable is bent, local stress concentration is less likely to occur in the shield.

By providing the second sheath, the shield and another cable become less likely to come into direct contact with each other. Therefore, the other cable is less likely to be damaged because the shield slides with the other cable.

In the composite cable of one aspect of the present disclosure, by arranging the electric wire, the first sheath, the shield, and the second sheath in this order from the inside to the outside, it is possible to achieve an effect that local stress concentration is less likely to occur in the shield even when the composite cable is bent, and occurrence of damage of the shield is easily suppressed.

BRIEF DESCRIPTION OF THE DRAWINGS

An example embodiment of the present disclosure will be described hereinafter by way of example with reference to the accompanying drawing, wherein FIG. 1 is a cross-sectional view for explaining a configuration of a composite cable according to an embodiment of the present disclosure.

DETAILED DESCRIPTION OF EXEMPLARY EMBODIMENTS

Hereinafter, a composite cable 1 according to one embodiment of the present disclosure will be described with reference to FIG. 1. The present embodiment is described with the present disclosure applied to an example in which the composite cable 1 is a cable used for an EMB device. The composite cable 1 may be used in a device other than the EMB device.

FIG. 1 is a cross-sectional view for explaining the configuration of the composite cable 1 of the present embodiment. As illustrated in FIG. 1, the composite cable 1 is provided with one internal cable 10, two power wires 20 and 20, one ground wire 30, and an outer sheath (corresponding to covering member) 40.

The number of the internal cable 10 may be two or more. The number of the power wires 20 and 20 may be one or three or more. The number of the ground wire 30 may be two or more.

The internal cable 10 is a signal wire that propagates electrical signals output from various sensors provided in the EMB device and electrical signals used in a controller area network (CAN). Examples of the various sensors include a load sensor and an angle sensor.

The internal cable 10 is provided with two twisted electric wires 11 and 11, a first sheath 15 covering the peripheries of the two electric wires 11 and 11, a shield 16 covering the periphery of the first sheath 15, and a second sheath 17 covering the periphery of the shield 16. The first sheath 15 is interposed between the two electric wires 11.

The electric wire 11 is a signal wire connected to the sensor in an electrically conductible manner. The two electric wires 11 and 11 are in contact with each other and twisted together. The present embodiment is described with the present disclosure applied to an example in which the two electric wires 11 and 11 have the same configuration. The electric wire 11 is provided with a conductor 12 and a sheath 13 covering the periphery of the conductor 12.

The conductor 12 is a member formed in an elongated shape, and is a member in which a plurality of conductive metal wires such as copper or an alloy containing copper as a component are twisted. The cross section of the conductor 12 may be circular, elliptical, or rectangular.

The sheath 13 is a member formed of a resin material that covers the periphery of the conductor 12 in a layered manner. As the resin for forming the sheath 13, a known resin can be used, and its type is not particularly limited.

The first sheath 15 is a member formed of a resin material that covers the peripheries of the two electric wires 11 and 11. The first sheath 15 is a member that supports the shield 16. The first sheath 15 is a columnar member having a solid configuration including two electric wires 11 and 11 therein.

The cross section of the first sheath 15 preferably has a shape in which stress acting on the shield 16 when the composite cable 1 is bent is dispersed. Specifically, it is preferable that all sides of the cross section of the first sheath 15 are formed of curves. The present embodiment is described with the present disclosure applied to an example in which the first sheath 15 is a columnar member having a substantially circular or substantially elliptical cross section.

An outer peripheral surface of the first sheath 15 is provided with irregularities for enhancing surface roughness. As a processing method for forming irregularities, embossing in which a plate provided with irregularities is pressed against the outer peripheral surface of the first sheath 15 can be used. As the surface roughness, 3 μm can be exemplified.

A resin material used as the resin material constituting the first sheath 15 does not contain a flame retardant and has higher flexibility at low temperature than a resin material containing a flame retardant and constituting the second sheath 17 described later. As the resin material constituting the first sheath 15, a resin material having a Shore D hardness of 80 or less is used, and for example, urethane rubber or silicone rubber is used.

The shield 16 is a member that is disposed on the outer peripheral surface of the first sheath 15 and that shields electromagnetic noise. The electromagnetic noise may be generated by power flowing through the electric wire 11 or may be generated outside the internal cable 10.

The present embodiment is described with the present disclosure applied to an example in which the shield 16 is a braid in which wires formed of a conductive metal material are assembled. For example, the present embodiment is described with the present disclosure applied to an example of copper foil yarn braid. The shield 16 may be a metallic thin film having conductivity.

The second sheath 17 is a member formed of a resin material that covers the periphery of the shield 16. The second sheath 17 is a member having a tubular configuration formed in a layered shape along the outer peripheral surface of the shield 16.

An outer peripheral surface in the second sheath 17 is provided with irregularities for enhancing surface roughness. As a processing method for forming irregularities, embossing in which a plate provided with irregularities is pressed against the outer peripheral surface of the second sheath 17 can be used. As the surface roughness, 3 μm can be exemplified.

The resin material constituting the second sheath 17 contains a flame retardant. As the resin material constituting the second sheath 17, a resin material having a Shore D hardness of 90 or less is used. For example, a polyethylene resin, a fluororesin, or ethylene-propylene-diene rubber (also referred to as EPDM) is used.

As the flame retardant used for the second sheath 17, silica (silicon dioxide), a metal hydroxide (magnesium hydroxide or aluminum hydroxide), a bromine-based flame retardant, a phosphoric acid-based flame retardant, a nitrogen-based flame retardant, and a combination of a bromine-based flame retardant and antimony trioxide can be exemplified. The present embodiment is described with the present disclosure applied to an example in which silica is used as a flame retardant.

The number of the electric wires 11 provided in the internal cable 10 may be two as described above or three or more. Furthermore, the number of the electric wire 11 provided in the internal cable 10 may be one.

The two power wires 20 and 20 are power wires for supplying electric power to an electric motor or an actuator provided in the EMB device. The power wire 20 is provided with a conductor 21 and a sheath 22.

The conductor 21 is a member formed in an elongated shape, and is a member in which a plurality of conductive metal wires such as copper or an alloy containing copper as a component are twisted. The cross section of the conductor 21 may be circular, elliptical, or rectangular.

The sheath 22 is a member formed of a resin material that covers the periphery of the conductor 21 in a layered manner. As the resin for forming the sheath 22, a known resin can be used, and its type is not particularly limited.

One ground wire 30 is an electric wire used for grounding. The ground wire 30 is provided with a conductor 31 and a sheath 32. The present embodiment is described with the present disclosure applied to an example in which the composite cable 1 is provided with the ground wire 30, but the composite cable 1 need not be provided with the ground wire 30.

The conductor 31 is a member formed in an elongated shape, and is a member in which a plurality of conductive metal wires such as copper or an alloy containing copper as a component are twisted. The cross section of the conductor 31 may be circular, elliptical, or rectangular.

The sheath 32 is a member formed of a resin material that covers the periphery of the conductor 31 in a layered manner. As the resin for forming the sheath 32, a known resin can be used, and its type is not particularly limited.

The outer sheath 40 is a member formed of a resin material that covers the periphery of one internal cable 10, two power wires 20 and 20, and one ground wire 30 in a layered manner. As the resin for forming the outer sheath 40, a known resin can be used, and its type is not particularly limited.

In the composite cable 1 having the above-described configuration, the electric wires 11 and 11, the first sheath 15, the shield 16, and the second sheath 17 are arranged in this order from the inside to the outside, whereby the shield 16 is supported by the first sheath 15 arranged on the electric wire 11 side. Therefore, even when the shield 16 receives a force directed from the second sheath 17 toward the electric wire 11 side, the cross-sectional shape of the shield 16 is hardly deformed. Furthermore, even when the composite cable 1 is bent, local stress concentration is less likely to occur in the shield 16, and occurrence of damage of the shield 16 is easily suppressed.

By providing the second sheath 17, the shield 16 and the power wires 20 and 20 and the like become less likely to come into direct contact with each other. Therefore, the shield 16 slides on the power wires 20 and 20 and the like, whereby the power wires 20 and 20 and the like become less likely to be damaged.

Since the flame retardant is contained in the material forming the second sheath 17, it is easy to impart heat resistance to the internal cable 10.

By enhancing the flexibility of the first sheath 15 as compared with the second sheath 17, the internal cable 10 becomes less likely to be damaged. For example, when the composite cable 1 is bent, the first sheath 15 is less likely to be damaged because the flexibility of the first sheath 15 that is bent more greatly is high.

By forming the first sheath 15 using a material having a hardness lower than that of the second sheath 17, the internal cable 10 becomes less likely to be damaged. For example, when the composite cable 1 is bent, the first sheath 15 is less likely to be damaged because the hardness of the first sheath 15 that is bent more greatly is low.

By providing the outer peripheral surface of the first sheath 15 with the irregularities for enhancing surface roughness, the first sheath 15 and the shield 16 become easy to be relatively moved. By providing the outer peripheral surface of the second sheath 17 with the irregularities for enhancing surface roughness, the internal cable 10 and the outer sheath 40 become easy to be relatively moved. Therefore, when the composite cable 1 is bent, distortion becomes less likely to occur in the conductor 12 of the electric wire 11 disposed inside the first sheath 15.

The first sheath 15 may be constituted of foamed polyethylene not containing a flame retardant instead of urethane rubber or silicone rubber. In this case, the resin material constituting the second sheath 17 is not foamed.

By using foamed polyethylene, a plurality of holes are provided inside the first sheath 15. This makes it easy to reduce the permittivity of the first sheath 15. By lowering the permittivity of the first sheath 15, it is easy to lower the characteristic impedance and reduce loss of the current flowing through the conductor 12.

The electric wire 11 of the internal cable 10 may be a signal wire connected to the sensor in an electrically conductible manner as described above, may be a drain wire in the first sheath 15, or may be a power wire for supplying electric power to equipment.

The technical scope of the present disclosure is not limited to the above embodiments, and various modifications can be made without departing from the gist of the present disclosure. For example, the present disclosure is not limited to the embodiments described above, but may be applied to an embodiment in which these embodiments are appropriately combined, and is not particularly limited.

What is claimed is:

1. A composite cable comprising:

a plurality of first electric wires each having a first conductor and a first resin layer covering the first conductor;

an internal cable including a plurality of second electric wires each having a second conductor and a second resin layer covering the second conductor, a first sheath formed of a resin material covering a periphery of the plurality of second electric wires and being interposed between the plurality of second electric wires, a shield covering a periphery of the first sheath and contacting the first sheath, and a second sheath covering a periphery of the shield and contacting the shield; and a covering member that covers peripheries of the plurality of first electric wires and the internal cable, wherein the covering member forms an outermost peripheral surface of the composite cable, wherein the first sheath is provided with irregularities which enhance surface roughness of an outer peripheral surface of the first sheath contacting the shield, and wherein the second sheath is provided with irregularities which enhance surface roughness of an outer peripheral surface of the second sheath contacting the first electric wires and the covering member.

2. The composite cable according to claim 1, wherein a material forming the second sheath contains a flame retardant.

3. The composite cable according to claim 2, wherein the first sheath is higher in flexibility than the second sheath.

4. The composite cable according to claim 1, wherein the first sheath is higher in flexibility than the second sheath.

5. The composite cable according to claim 1, wherein the first sheath is formed using a material having hardness lower than hardness of a material of the second sheath.

6. The composite cable according to claim 5, wherein:

the first sheath comprises a resin material having a Shore D hardness of 80 or less, and the second sheath comprises a resin material having a Shore D hardness of 90 or less.

7. The composite cable according to claim 1, wherein a plurality of holes is provided inside the first sheath.

8. The composite cable according to claim 1, wherein a material forming the first sheath does not contain a flame retardant.

9. The composite cable according to claim 1, wherein the plurality of first electric wires are in contact with each other, wherein the plurality of first electric wires and the second sheath are in contact with each other, and wherein the second sheath extends into a valley of a space created by the plurality of first electric wires being contacted.

* * * * *